United States Patent
Hong et al.

(10) Patent No.: US 12,196,836 B2
(45) Date of Patent: Jan. 14, 2025

(54) METHOD FOR PERFORMING POSITIONING OPERATION ON BASIS OF ULTRA-WIDEBAND SIGNAL AND ELECTRONIC DEVICE SUPPORTING SAME

(71) Applicant: Samsung Electronics Co., Ltd., Suwon-si (KR)

(72) Inventors: Sukgi Hong, Suwon-si (KR); Sehwan Choi, Suwon-si (KR); Hyunchul Kim, Suwon-si (KR); Yi Yang, Suwon-si (KR); Jungsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 17/960,993

(22) Filed: Oct. 6, 2022

(65) Prior Publication Data
US 2023/0024636 A1 Jan. 26, 2023

Related U.S. Application Data

(63) Continuation of application No. PCT/KR2021/003624, filed on Mar. 24, 2021.

(30) Foreign Application Priority Data

Apr. 22, 2020 (KR) .......................... 10-2020-0048539

(51) Int. Cl.
 *G01S 11/02* (2010.01)
(52) U.S. Cl.
 CPC ..................... *G01S 11/02* (2013.01)
(58) Field of Classification Search
 CPC ...... G01S 5/0247; G01S 5/0258; G01S 11/02; G01S 19/54; G01S 19/03

(Continued)

(56) References Cited

U.S. PATENT DOCUMENTS

| 7,970,080 B1 * | 6/2011 | Isaksen | H04L 27/3854 |
| | | | 375/232 |
| 8,379,698 B2 * | 2/2013 | Murray | H04L 27/2653 |
| | | | 375/220 |

(Continued)

FOREIGN PATENT DOCUMENTS

| KR | 10-1178042 B1 | 8/2012 |
| KR | 10-2015-0052753 A | 5/2015 |
| WO | 2019/051036 A1 | 3/2019 |

OTHER PUBLICATIONS

Kram, Sebastian et al., "UWB Channel Impulse Responses for Positioning in Complex Environments: A Detailed Feature Analysis", MDPI Sensors, Dec. 16, 2019, pp. 1-26.

*Primary Examiner* — Bo Fan
(74) *Attorney, Agent, or Firm* — Jefferson IP Law, LLP (57) ABSTRACT

An electronic device is provided. The electronic device includes an antenna and an ultra wide band (UWB) communication circuit connected with the antenna. The UWB communication circuit is configured to filter a positioning signal received from the antenna into a specified band to be converted into a digital signal, generate a UWB packet including a first field associated with synchronization and a second field associated with security, obtain a first channel impulse response corresponding to the first field and a second channel impulse response corresponding to the second field, when the UWB packet is valid based on the second field, obtain a third channel impulse response, when there is a correlation between the first channel impulse response and the second channel impulse response, and measure a distance to the external electronic device based on the third channel impulse response.

15 Claims, 8 Drawing Sheets

(58) Field of Classification Search
USPC ...... 342/458, 417, 371, 354, 357.48, 357.72
See application file for complete search history.

(56) References Cited

U.S. PATENT DOCUMENTS

| | | |
|---|---|---|
| 8,436,758 B2 | 5/2013 | McLaughlin et al. |
| 8,760,334 B2 | 6/2014 | McLaughlin et al. |
| 10,038,472 B2 | 7/2018 | McLaughlin et al. |
| 10,084,507 B2 | 9/2018 | McLaughlin et al. |
| 10,305,540 B2 | 5/2019 | McLaughlin et al. |
| 10,353,048 B2 | 7/2019 | Oh et al. |
| 10,491,266 B2 | 11/2019 | McLaughlin et al. |
| 10,897,278 B2 * | 1/2021 | Balakrishnan ....... H04B 1/1646 |
| 2015/0323642 A1 * | 11/2015 | Mutz .................. G01S 3/74 |
| | | 342/417 |
| 2020/0014526 A1 | 1/2020 | Hammerschmidt et al. |

\* cited by examiner

METHOD FOR PERFORMING POSITIONING OPERATION ON BASIS OF ULTRA-WIDEBAND SIGNAL AND ELECTRONIC DEVICE SUPPORTING SAME

CROSS-REFERENCE TO RELATED APPLICATION(S)

This application is a continuation application, claiming priority under § 365(c), of an International application No. PCT/KR2021/003624, filed on Mar. 24, 2021, which is based on and claims the benefit of a Korean patent application number 10-2020-0048539, filed on Apr. 22, 2020, in the Korean Intellectual Property Office, the disclosure of which is incorporated by reference herein in its entirety.

BACKGROUND

1. Field

The disclosure relates to technologies of performing positioning using an ultra wide band (UWB) wireless signal.

2. Description of Related Art

Ultra wide band (UWB) communication is a wireless communication technology which transmits a large amount of information using low power over a very wide area compared to an existing frequency band. The Federal Communications Commission (FCC) defines the UWB communication as 'a wireless communication technology which has the bandwidth occupied by 20% or more of the center frequency or occupies the occupied bandwidth of 500 megahertz (MHz) or more. In general, the UWB communication may be defined as a short-range wireless communication technology for implementing high-speed communication using low power over a very wide area compared to an existing spectrum at a speed of 100 Mbps or more in a band of 3.1 gigahertz (GHz) to 10.6 GHz. The UWB communication has features which use relatively low power at the same time as using an ultra wide band.

The above information is presented as background information only to assist with an understanding of the disclosure. No determination has been made, and no assertion is made, as to whether any of the above might be applicable as prior art with regard to the disclosure.

SUMMARY

In UWB communication, a secure field (e.g., a scramble time stamp sequence (STS)) may be included in a UWB packet to strengthen security and improve performance according to a channel environment. However, when the secure field is included in the UWB packet, the structure of the UWB packet may be complicated. Furthermore, due to effective isotropic radiated power (EIRP) restrictions, the UWB packet needs to be transmitted as short as possible. Thus, when the UWB packet including the secure field is transmitted as short as possible, the accuracy of UWB communication may be degraded.

Aspects of the disclosure are to address at least the above-mentioned problems and/or disadvantages and to provide at least the advantages described below. Accordingly, an aspect of the disclosure is to provide an electronic device capable of generating channel impulse responses corresponding to both of a synchronization (SYNC) field and a secure field of a UWB packet received upon a positioning operation based on UWB communication to improve the accuracy of the positioning operation.

Additional aspects will be set forth in part in the description which follows and, in part, will be apparent from the description, or may be learned by practice of the presented embodiments.

In accordance with an aspect of the disclosure, an electronic device is provided. The electronic device includes an antenna that transmits and receives a signal with an external electronic device and an ultra wide band (UWB) communication circuit connected with the antenna. The UWB communication circuit may be configured to filter a positioning signal received from the antenna into a specified band to be converted into a digital signal, generate a UWB packet including a first field associated with synchronization and a second field associated with security, based on the digital signal, obtain a first channel impulse response corresponding to the first field and a second channel impulse response corresponding to the second field, when the UWB packet is valid based on the second field, obtain a third channel impulse response corresponding to synthetic data in which data of the first field and data of the second field are synthesized with each other, when there is a correlation between the first channel impulse response and the second channel impulse response, and measure a distance to the external electronic device based on the third channel impulse response.

In accordance with another aspect of the disclosure, a positioning method based on an ultra wide band (UWB) signal to measure a distance to an external electronic device is provided. The positioning method includes filtering, by a UWB communication circuit, a positioning signal received from the external electronic device into a specified band to be converted into a digital signal, generating, by the UWB communication circuit, a UWB packet including a first field associated with synchronization and a second field associated with security, obtaining, by the UWB communication circuit, a first channel impulse response corresponding to the first field and a second channel impulse response corresponding to the second field, when the UWB packet is valid based on the second field, obtaining, by the UWB communication circuit, a third channel impulse response corresponding to synthetic data in which data of the first field and data of the second field are synthesized with each other, when there is a correlation between the first channel impulse response and the second channel impulse response, and measuring, by the UWB communication circuit, the distance to the external electronic device based on the third channel impulse response.

According to embodiments disclosed herein, the electronic device using ultra wide band (UWB) communication may generate channel impulse responses corresponding to both of a SYNC field and a secure field of a UWB packet received upon a positioning operation, thus improving the accuracy of the positioning operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
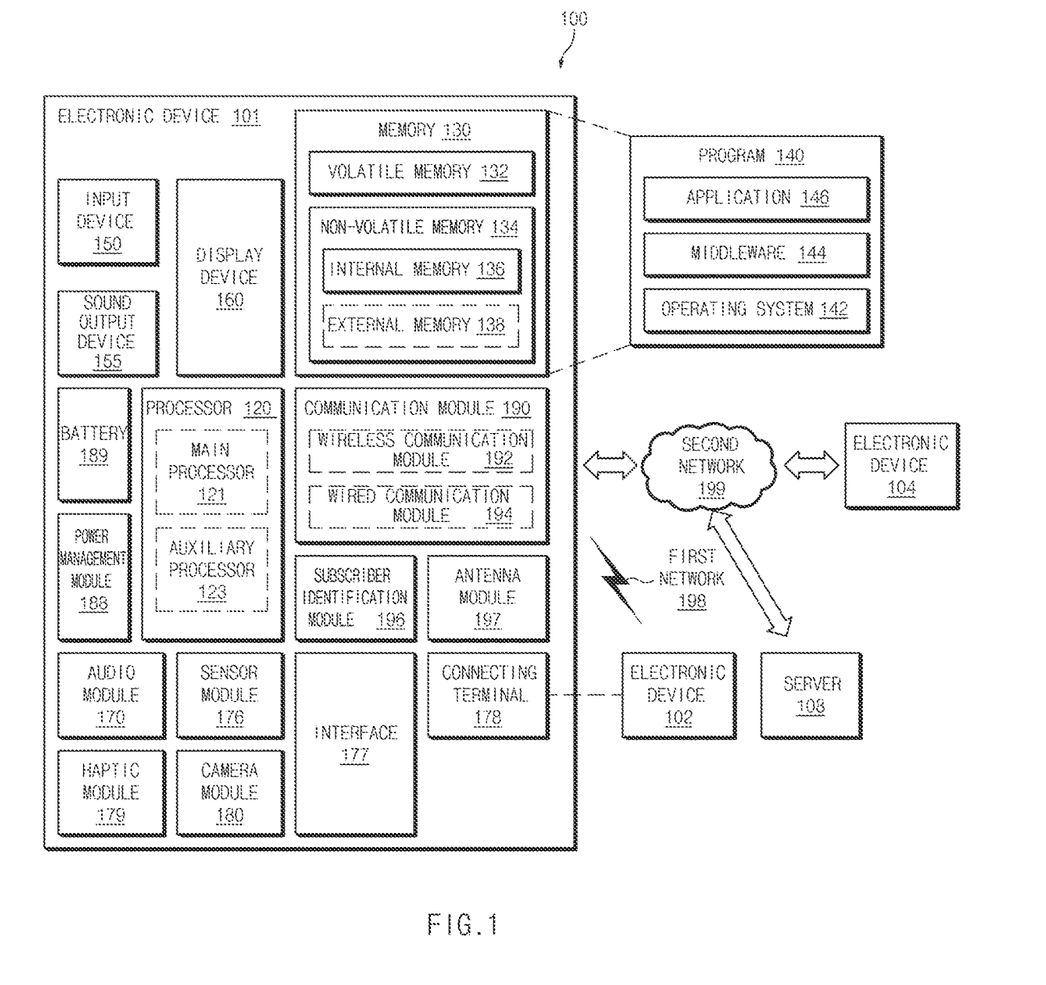
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
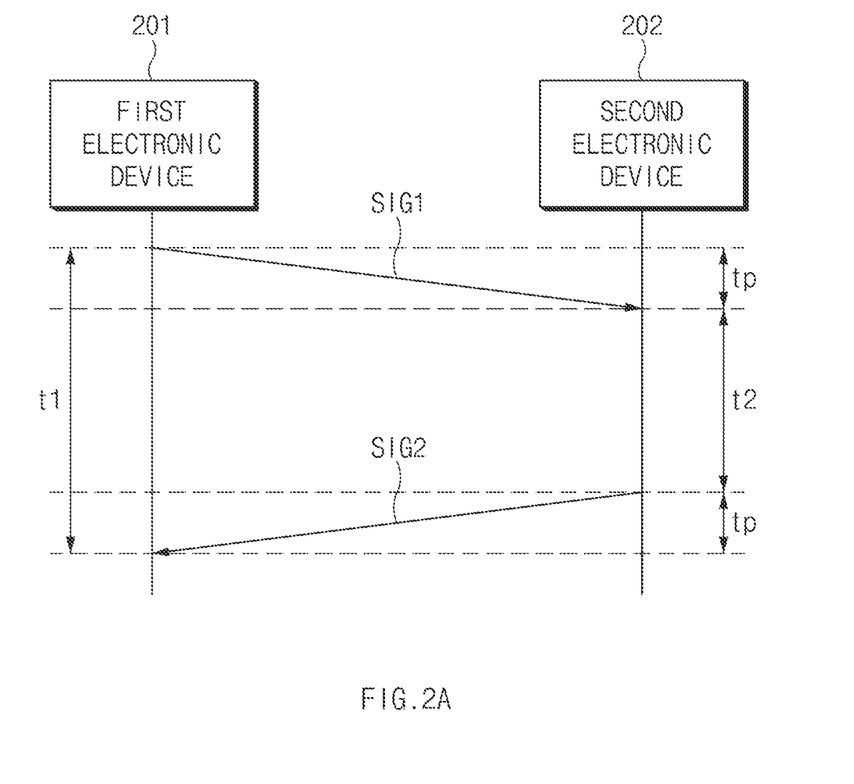
FIG. 2A is a drawing illustrating an example of an electronic device using an ultra wide band (UWB) communication scheme according to an embodiment of the disclosure.
Figure 2B:
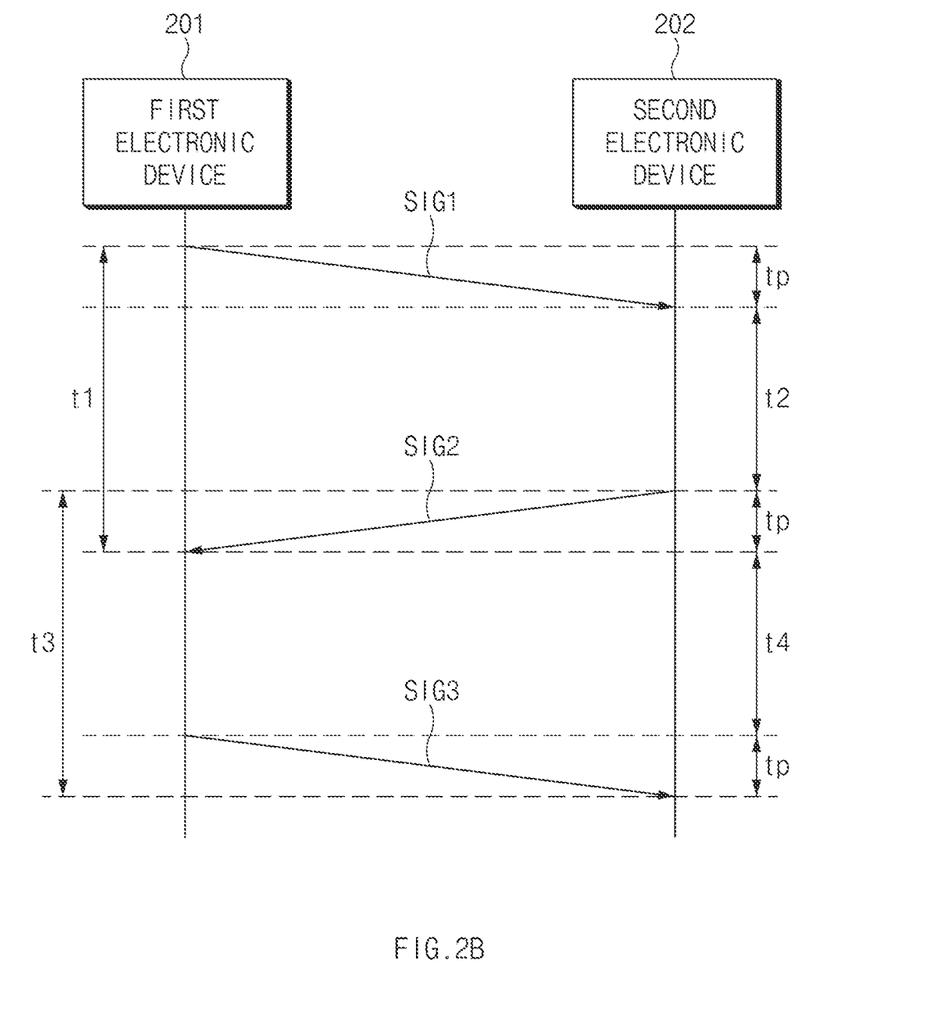
FIG. 2B is a drawing illustrating another example of an electronic device using a UWB communication scheme according to an embodiment of the disclosure.

FIG. 2A is a drawing illustrating an example of an electronic device using an ultra wide band (UWB) communication scheme according to an embodiment of the disclosure. FIG. 2B is a drawing illustrating another example of an electronic device using a UWB communication scheme according to an embodiment of the disclosure.

Referring to FIGS. 2A and 2B, a first electronic device 201 (e.g., an electronic device 101) may measure a distance from a second electronic device 202 (e.g., a smartphone, a vehicle, a laptop, or a door lock) (or a direction of the second electronic device 202) using a UWB communication signal. For example, the first electronic device 201 may exchange at least one positioning signal with the second electronic device 202. The at least one positioning signal may include information about a time taken while the at least one positioning signal is transmitted between the first electronic device 201 and the second electronic device 202. The first electronic device 201 may measure a distance from the second electronic device 202 (or a direction of the second electronic device 202) based on the information about the time. For example, the first electronic device 201 may measure a transmission time of the at least one positioning signal using a technique such as single-sided two-way ranging (SS-TWR) or double-sided two-way ranging (DS-TWR) and may measure a distance between the first electronic device 201 and the second electronic device 202 by means of a distance measurement algorithm such as time of flight (ToF), time of arrival (TOA), or time difference of arrival (TDOA) based on the transmission time.

Referring to FIG. 2A, the first electronic device 201 may measure a distance between the first electronic device 201 and the second electronic device 202 by means of the SS-TWR technique. The first electronic device 201 may measure a first time t1 until a time point when a second signal SIG2 is received from a time point when a first signal SIG1 is transmitted. The second electronic device 202 may measure a second time t2 until a time point when the second signal SIG2 is transmitted from a time point when the first signal SIG1 is received. The first electronic device 201 may calculate (e.g., tp=(t1-t2)/2) a signal movement time tp between the first electronic device 201 and the second electronic device 202 based on the first time t1 and the second time t2. The first electronic device 201 may calculate a distance between the first electronic device 201 and the second electronic device 202 based on the signal movement time tp.

Referring to FIG. 2B, the first electronic device 201 may measure a distance between the first electronic device 201 and the second electronic device 202 by means of the DS-TWR technique. The first electronic device 201 may measure the signal movement time tp two times and may average the measured signal movement times tp to use it to calculate a distance. As shown in FIG. 2A, the first electronic device 201 may calculate (e.g., tp=(t1-t2)/2) the signal movement time tp based on the first time t1 and the second time t2. Furthermore, the first electronic device 201 may measure a third time t3 until a time point when a third signal SIG3 is transmitted from a time point when the second signal SIG2 is received. The second electronic device 202 may measure a fourth time t4 until a time point when the third signal SIG3 is received from a time point when the second signal (SIG2) is transmitted. The first electronic device 201 may calculate (e.g., tp=(t3-t4)/2) a movement time tp between the first electronic device 201 and the second electronic device 202 again based on the third time t3 and the fourth time t4. The first electronic device 201 may calculate an average of the measured signal movement times tp. The first electronic device 201 may calculate a distance between the first electronic device 201 and the second electronic device 202 based on the calculated average signal movement time.

Figure 3:
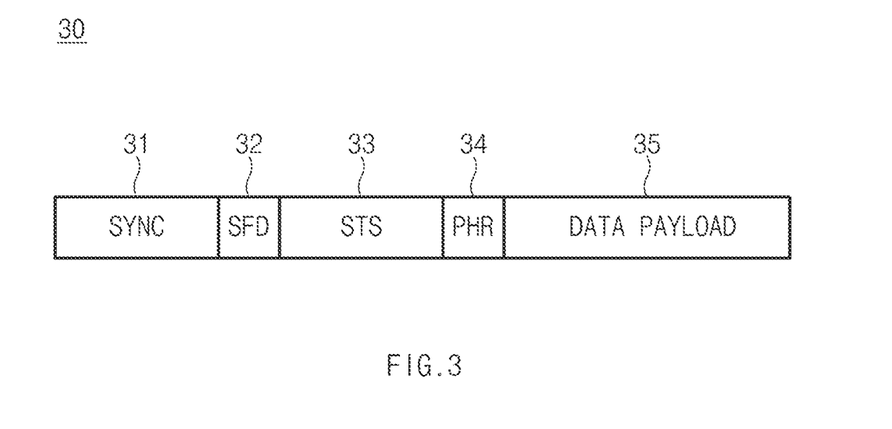
FIG. 3 is a drawing illustrating a packet structure of a positioning signal according to an embodiment of the disclosure.

FIG. 3 is a drawing illustrating a packet structure of a positioning signal received in an electronic device according to an embodiment of the disclosure.

Referring to FIGS. 2A, 2B, and 3, at least one positioning signal received by a first electronic device 201 may include an ultra wide band (UWB) packet 30. The UWB packet 30 may include a plurality of fields. The UWB packet 30 may include a synchronization (SYNC) field 31, a start-of-frame delimiter (SFD) field 32, a scrambled timestamp sequence (STS) field 33, a physical layer header (PHR) field 34, or a data payload field 35.

The SYNC field 31 may indicate a start portion of the UWB packet 30. For example, the SYNC field 31 may include a preamble code. The first electronic device 201 may detect the preamble code of the SYNC field 31 and may perform synchronization of the UWB packet 30. The first electronic device 201 may compare correlations between the preamble codes and may identify whether the same UWB packet 30 as the corresponding preamble code is received.

The SFD field 32 may become a reference point of a time stamp in the UWB packet structure.

The STS field 33 may be used to complement the security of the UWB packet 30. For example, the STS field 33 may complement a security vulnerability of the preamble code of the SYNC field 31. For example, the STS field 33 may compare correlations by means of a series of codes made using a random number to identify the security of the UWB packet 30. A seed for generating the random number of the STS field 33 may be stored in a secure element (e.g., an embedded secure element (eSE)) of the first electronic device 201. Thus, the first electronic device 201 may strengthen security for an external attack. The first electronic device 201 may compare a value (e.g., a reference code) exchanged with a second electronic device 202 with the STS field 33 to identify whether there is security of the UWB packet 30.

The PHR field 34 may include information necessary for UWB communication. For example, the PHR field 34 is a header unit for the data payload field 35. The data payload field 35 may include data transmitted between the first electronic device 201 and the second electronic device 202.

Figure 4:
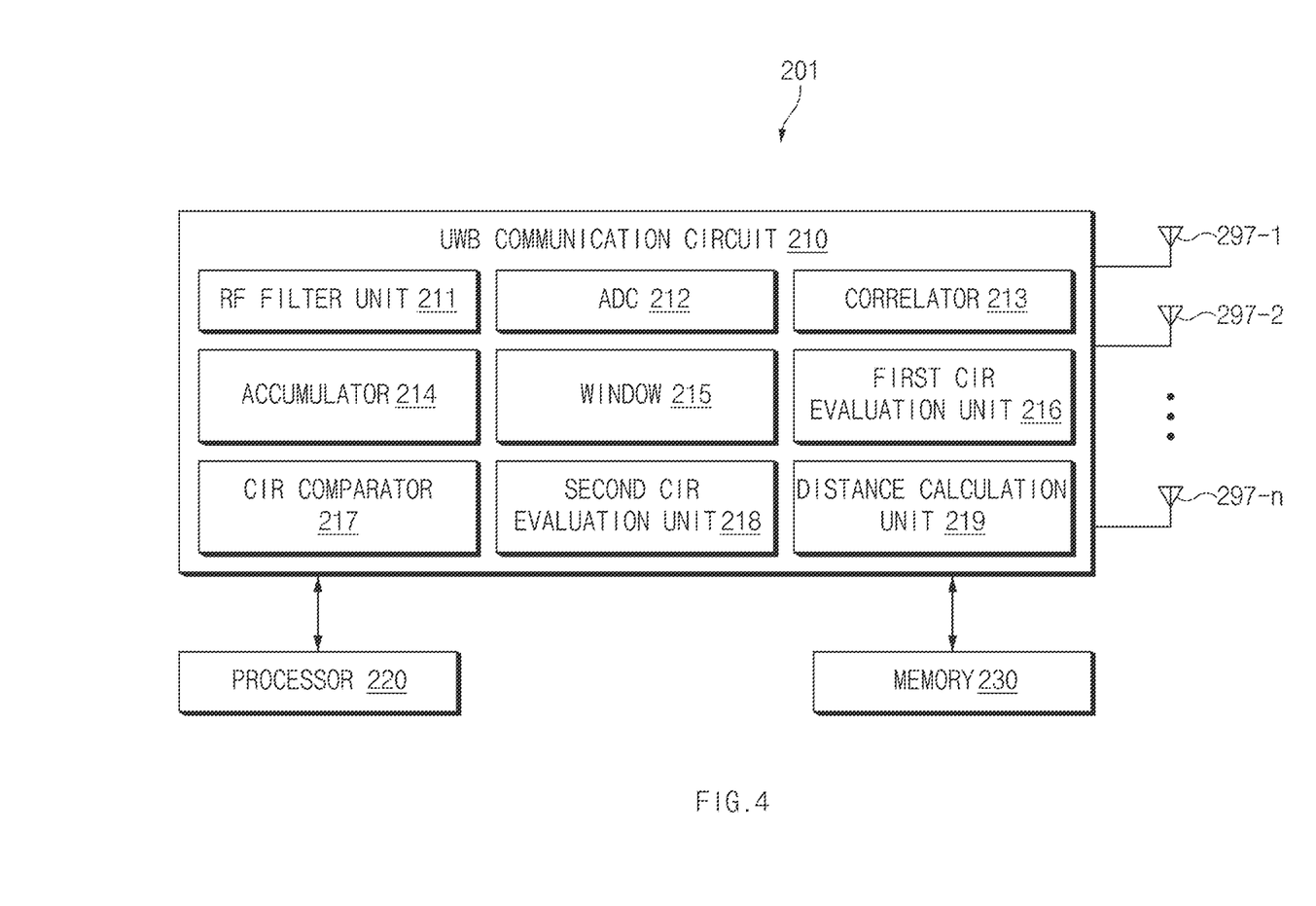
FIG. 4 is a drawing illustrating a UWB communication circuit included in an electronic device according to an embodiment of the disclosure.

FIG. 4 is a drawing illustrating a UWB communication circuit included in an electronic device according to an embodiment of the disclosure.

Referring to FIGS. 2A, 2B, 3, and 4, a first electronic device 201 may include a UWB communication circuit 210, a processor 220 (e.g., a processor 120), and a memory 230 (e.g., a memory 130). The UWB communication circuit 210 may be connected with at least one antenna 297-1 to 297-n to receive at least one positioning signal. The UWB communication circuit 210 may perform a positioning operation under an instruction of the processor 220. The UWB communication circuit 210 may store data generated upon the positioning operation in the memory 230. The UWB communication circuit 210 may be included in a communication circuit 190 of FIG. 1.

The UWB communication circuit 210 may include an RF filter unit 211, an analog-digital converter (ADC) 212, a correlator 213, an accumulator 214, a window 215, a first channel impulse response (CIR) evaluation unit 216, a CIR comparator 217, a second CIR evaluation unit 218, and a distance calculation unit 219.

The RF filter unit 211 may output the at least one positioning signal by means of filtering of a specific band for signals received through the at least one antenna 297-1 to 297-n. The ADC 212 may convert the at least one positioning signal into a digital signal. The digital signal may be made up in the form of a packet (e.g., a UWB packet 30) of FIG. 3. The correlator 213 may identify a start portion of the UWB packet 30 by means of a SYNC field 31. The correlator 213 may compare an STS field 33 with a previously stored reference code. When there is a correlation between the STS field 33 and the reference code (or when the same portion between the STS field 33 and the reference code is greater than or equal to a specified rate (e.g., 50%) or a specified numerical number), the correlator 213 may determine that the UWB packet 30 is valid. Furthermore, when an energy value of the SYNC field 31 is greater than or equal to a specified value, the correlator 213 may determine that the UWB packet 30 is valid. The accumulator 214 may accumulate the UWB packet 30 determined as being valid (hereinafter, a valid UWB packet). The accumulated valid UWB packets may be stored in the memory 230. The first CIR evaluation unit 216 may obtain a channel impulse response for the valid UWB packets. The window 215 may arrange the valid UWB packets to determine the channel impulse response. For example, the first CIR evaluation unit 216 may generate a first channel impulse response (CIR) corresponding to the SYNC field 31. The first CIR evaluation unit 216 may generate a second channel impulse response (CIR) corresponding to the STS field 33. The CIR comparator 217 may compare the first CIR with the second CIR to identify a correlation. For example, the first electronic device 201 and a second electronic device 202 may predefine a preamble code of the SYNC field 31 or a series of codes of the STS field 33 for UWB communication. The first electronic device 201 may determine whether the signal received from the second electronic device 202 is a predefined signal by means of the channel impulse response.

When the correlation between the first CIR and the second CIR is greater than a specified value, or when the same portion between the first CIR and the second CIR is greater than or equal to a specified rate (e.g., 50%) or a specified numerical number, the UWB communication circuit 210 may calculate a distance between the first electronic device 201 and the second electronic device 202 using both the SYNC field 31 and the STS field 33. For example, when the correlation between the first CIR and the second CIR is greater than the specified value, a probability that there will be an external attack (e.g., communication interference by a hacker or a delay attack by a fake signal) on the UWB packet 30 may be low. Thus, when security is ensured and when a third CIR is obtained by using both the SYNC field 31 and the STS field 33 and the distance between the first electronic device 201 and the second electronic device 202 is calculated using the third CIR, the accuracy of the calculated distance may be improved.

When the correlation between the first CIR and the second CIR is less than the specified value, or when the same portion between the first CIR and the second CIR is less than the specified rate (e.g., 50%) or the specified numerical number, the UWB communication circuit 210 may calculate a distance between the first electronic device 201 and the second electronic device 202 using only the STS field 33. For example, when the correlation between the first CIR and the second CIR is less than the specified value, there may be a probability that there will be an external attack (e.g., communication interference by a hacker or a delay attack by a fake signal) on the UWB packet 30. A distance between the first electronic device 201 and the second electronic device 202 may be calculated using the second CIR corresponding to the STS field 33 to ensure security of the UWB packet 30.

The distance calculation unit 219 may obtain a distance between the first electronic device 201 and the second electronic device 202 based on a final channel impulse response (e.g., the second CIR or the third CIR). For example, the distance calculation unit 219 may determine a first path based on the final channel impulse response. The window 215 may be used to determine a value for detecting the first path. The distance calculation unit 219 may calculate a distance between the first electronic device 201 and the second electronic device 202 based on the first path.

Figure 5:
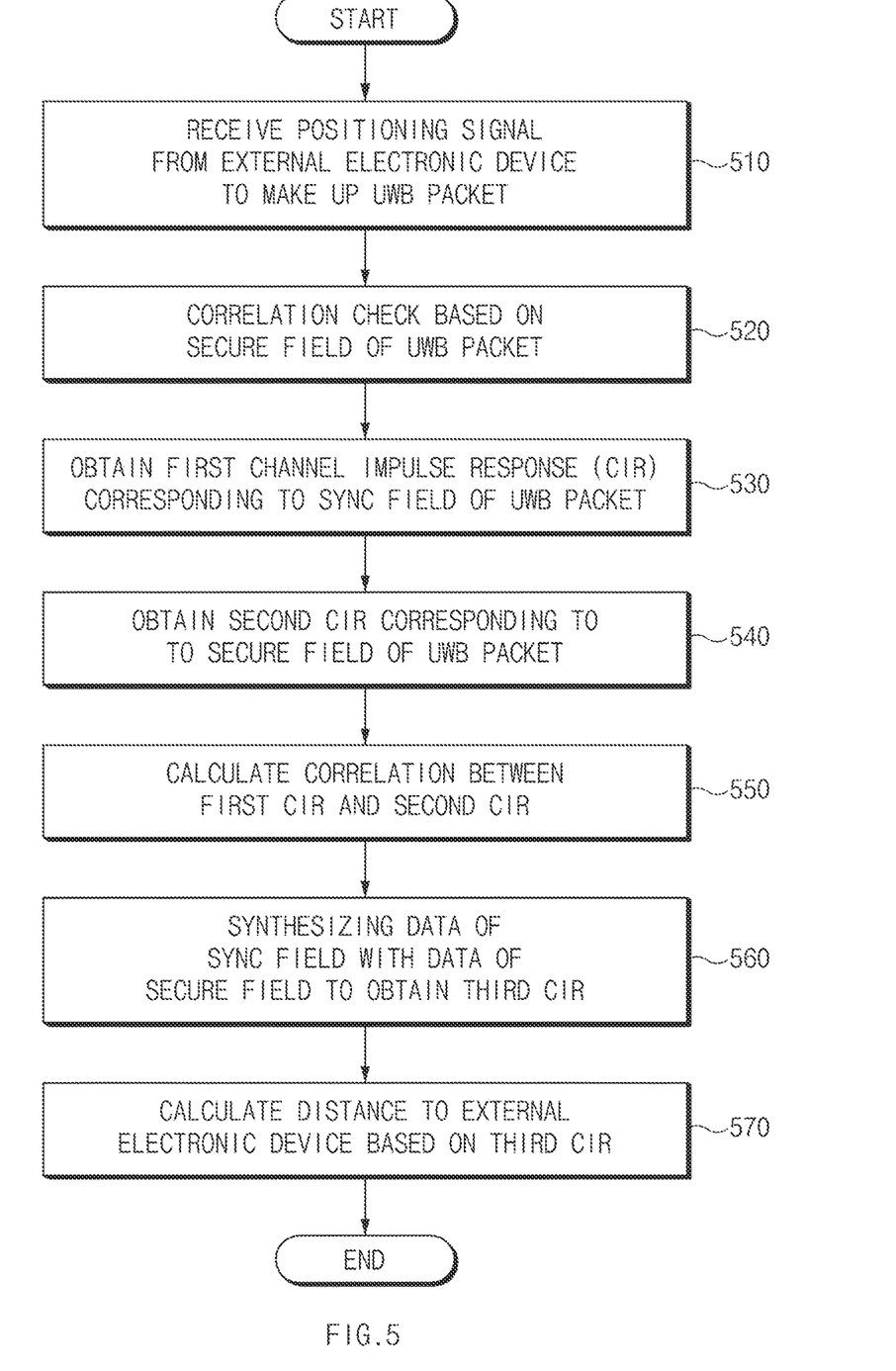
FIG. 5 is a flowchart illustrating an example of a UWB communication method of an electronic device according to an embodiment of the disclosure.

FIG. 5 is a flowchart illustrating an example of a UWB communication method of an electronic device according to an embodiment of the disclosure.

Referring to FIGS. 4 and 5, an electronic device (e.g., a first electronic device 201) may measure a distance to an external electronic device (e.g., a second electronic device 202) using a UWB signal. For example, when security of a specified criterion or more is ensured, the electronic device may improve the accuracy of measuring a distance to the external electronic device, using both of a SYNC field (or a synchronization field) (e.g., a SYNC field 31) and a secure field (e.g., a STS field 33) included in a UWB packet (e.g., a UWB packet 30).

In operation 510, the electronic device may transmit and receive at least one positioning signal with the external electronic device to make up the UWB packet (e.g., the UWB packet 30). For example, a UWB communication circuit 210 of the electronic device may receive signals through at least one antenna 297-1 to 297-n and may obtain a positioning signal (e.g., the at least one positioning signal) by means of filtering for a specified band. The UWB communication circuit 210 may convert the positioning signal into a digital signal to make up the UWB packet.

In operation 520, the UWB communication circuit 210 may perform a correlation check on the secure field of the UWB packet. For example, the secure field may be generated by means of a specified secure key (e.g., a seed) to generate a random number. The specified secure key may be stored in a secure element (e.g., an eSE) of the electronic device. The UWB communication circuit 210 may compare the secure field with a previously stored reference code to calculate a correlation. When the correlation is less than a specified value, the UWB packet may be transmitted from a device which is not associated with the electronic device (e.g., a device, an owner of which is different from the electronic device). Such a UWB packet (e.g., an invalid UWB packet) may be discarded. When the correlation is greater than or equal to the specified value, the UWB packet may be transmitted from a device associated with the electronic device (e.g., a device, the owner of which is the same as the electronic device). Such a UWB packet (e.g., a valid UWB packet) may be accumulated and stored.

In operation 530, the UWB communication circuit 210 may obtain a first channel impulse response (CIR) corresponding to the SYNC field (e.g., the SYNC field 31) of the valid UWB packet. For example, the UWB communication circuit 210 may accumulate the valid UWB packet a specified number of times and may arrange the accumulated valid UWB packets at a specified size to calculate the first channel impulse response (CIR).

In operation 540, the UWB communication circuit 210 may obtain a second channel impulse response (CIR) corresponding to the secure field (e.g., the STS field 33) of the valid UWB packet. For example, the communication circuit 210 may arrange the accumulated valid UWB packets at the specified size to calculate the second channel impulse response (CIR).

In operation 550, the UWB communication circuit 210 may compare the first channel impulse response (CIR) with the second channel impulse response (CIR) and may calculate a correlation. For example, the UWB communication circuit 210 may determine whether the same portion between the first channel impulse response (CIR) with the second channel impulse response (CIR) is greater than or equal to a specified rate (e.g., 50%) or a specified numerical number.

When the correlation between the first channel impulse response (CIR) and the second channel impulse response (CIR) is greater than or equal to the specified value, in operation 560, the UWB communication circuit 210 may obtain a third channel impulse response (CIR) for synthetic data in which data of the SYNC field and data of the secure field are synthesized with each other.

In operation 570, the UWB communication circuit 210 may calculate a distance to the external electronic device based on the third channel impulse response (CIR). For example, the UWB communication circuit 210 may determine a first path based on the third channel impulse response (CIR). The UWB communication circuit 210 may calculate the distance to the external electronic device based on the first path. For example, the UWB communication circuit 210 may select a point with the shortest time among points with an energy value of a specified value or more from the third channel impulse response (CIR). The UWB communication circuit 210 may calculate a distance value of the first path based on the shortest time.

As described above, the UWB communication circuit 210 may measure a distance to the external electronic device based on the third channel impulse response generated based on more data (e.g., synthetic data in which data of the SYNC field with data of the secure field are synthesized with each other) than the second channel impulse response corresponding to the secure field. Thus, the accuracy of the measured distance to the external electronic device may be improved.

Figure 6:
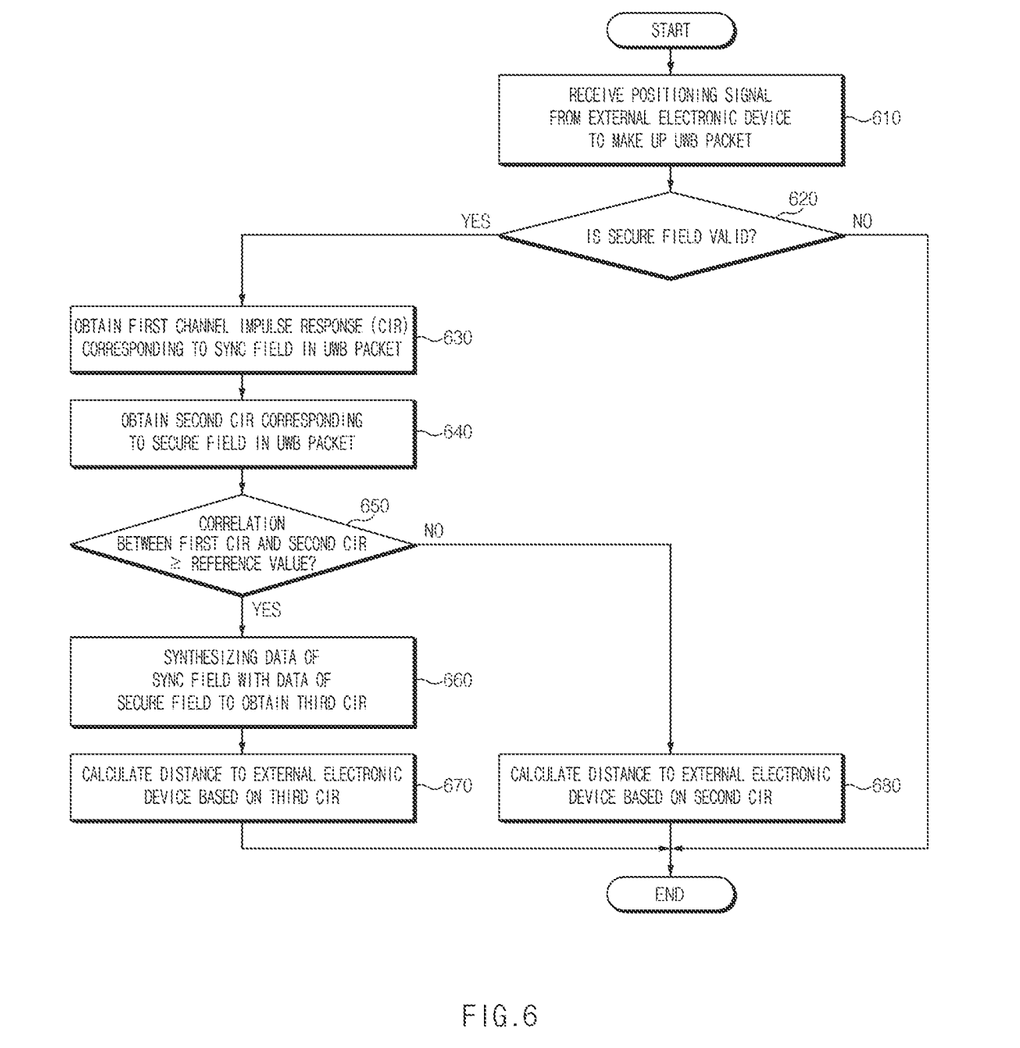
FIG. 6 is a flowchart illustrating another example of a UWB communication method of an electronic device according to an embodiment of the disclosure.

FIG. 6 is a flowchart illustrating another example of a UWB communication method of an electronic device according to an embodiment of the disclosure.

Referring to FIGS. 4 and 6, an electronic device (e.g., a first electronic device 201) may measure a distance to an external electronic device (e.g., a second electronic device 202) using a UWB signal. For example, when security of a specified criterion or more is ensured, the electronic device may improve the accuracy of measuring a distance to the external electronic device, using both of a SYNC field (or a synchronization field) (e.g., a SYNC field 31) and a secure field (e.g., a STS field 33) included in a UWB packet (e.g., a UWB packet 30).

In operation 610, the electronic device may receive a positioning signal (e.g., at least one positioning signal) from the external electronic device to make up the UWB packet (e.g., the UWB packet 30). For example, a UWB communication circuit 210 of the electronic device may receive signals through at least one antenna 297-1 to 297-n and may obtain a positioning signal (e.g., the at least one positioning signal) by means of filtering for a specified band. The UWB communication circuit 210 may convert the positioning signal into a digital signal to make up the UWB packet.

In operation 620, the UWB communication circuit 210 may inspect the validity of the secure field of the UWB packet. For example, the secure field may be generated by means of a specified random number. The UWB communication circuit 210 may compare the secure field with a previously stored reference code to calculate a correlation. As an example, when the correlation is less than a specified value (or when the secure field is not valid), the UWB packet may be transmitted from a device which is not associated with the electronic device (e.g., a device, an owner of which is different from the electronic device), and such a UWB packet (e.g., an invalid UWB packet) may be discarded. As various examples, when the correlation is greater than or equal to the specified value (or when the secure field is valid), the UWB packet may be transmitted from a device associated with the electronic device (e.g., a device, an owner of which is the same as the electronic device), and such a UWB packet (e.g., a valid UWB packet) may be accumulated and stored. At this time, the UWB communication circuit 210 may perform operation 630.

In operation 630, the UWB communication circuit 210 may obtain a first channel impulse response (CIR) corresponding to the SYNC field of the valid UWB packet. For example, the UWB communication circuit 210 may accumulate the valid UWB packet a specified number of times and may arrange the accumulated valid UWB packets at a specified size to calculate the first channel impulse response (CIR).

In operation 640, the UWB communication circuit 210 may obtain a second channel impulse response (CIR) corresponding to the secure field of the valid UWB packet. For example, the communication circuit 210 may arrange the accumulated valid UWB packets at the specified size to calculate the second channel impulse response (CIR).

In operation 650, the UWB communication circuit 210 may calculate a correlation between the first channel impulse response (CIR) and the second channel impulse response (CIR) and may compare the correlation with a reference value. For example, the UWB communication circuit 210 may determine whether the same portion between the first channel impulse response (CIR) and the second channel impulse response (CIR) is greater than or equal to a specified rate (e.g., 50%) or a specified numerical number. As an example, when the correlation is less than the reference value (or when the sample portion between the first channel impulse response (CIR) and the second channel impulse response (CIR) is less than the specified rate (e.g., 50%) or the specified numerical number), the UWB communication circuit 210 may perform operation 680. As various examples, when the correlation is greater than or equal to the reference value (or when the sample portion between the first channel impulse response (CIR) and the second channel impulse response (CIR) is greater than or equal to the specified rate (e.g., 50%) or the specified numerical number), the UWB communication circuit 210 may perform operation 660.

When the correlation is greater than or equal to the reference value (or when the sample portion between the first channel impulse response (CIR) and the second channel impulse response (CIR) is greater than or equal to the specified rate (e.g., 50%) or the specified numerical number), in operation 660, the UWB communication circuit 210 may obtain a third channel impulse response (CIR) for synthetic data in which data of the SYNC field and data of the secure field are synthesized with each other.

In operation 670, the UWB communication circuit 210 may calculate a distance to the external electronic device based on the third channel impulse response (CIR). For example, the UWB communication circuit 210 may determine a first path based on the third channel impulse response (CIR). The UWB communication circuit 210 may calculate the distance to the external electronic device based on the first path.

When the correlation is less than the reference value (or when the sample portion between the first channel impulse response (CIR) and the second channel impulse response (CIR) is less than the specified rate (e.g., 50%) or the specified numerical number), the UWB communication circuit 210 may determine the first path based on the second channel impulse response (CIR). The UWB communication circuit 210 may calculate the distance to the external electronic device based on the first path.

As described above, when the correlation between the first channel impulse response (CIR) and the second channel impulse response (CIR) is greater than or equal to the reference value, it may be determined that there is no security problem. The UWB communication circuit 210 may measure a distance to the external electronic device based on the channel impulse response generated based on more data than the second channel impulse response corresponding to the secure field (e.g., synthetic data in which data of the SYNC field and data of the secure field are synthesized with each other). Thus, the accuracy of the measured distance to the external electronic device may be improved. In various embodiments, when the correlation between the first channel impulse response (CIR) and the second channel impulse response (CIR) is greater than or equal to the reference value, focusing more on security, the UWB communication circuit 210 may measure the distance to the external electronic device based on the second channel impulse response corresponding to the secure field.

Figure 7:
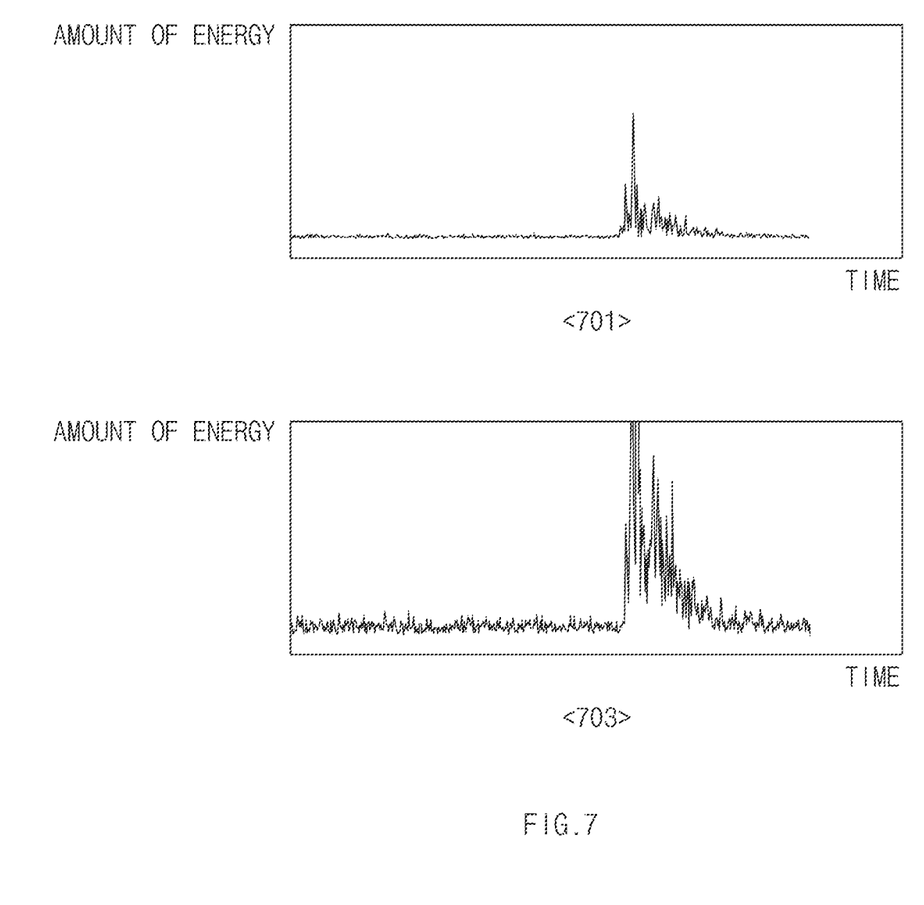
FIG. 7 is a drawing illustrating a channel impulse response obtained based on a UWB communication method of an electronic device according to an embodiment of the disclosure.

FIG. 7 is a drawing illustrating a channel impulse response obtained based on a UWB communication method of an electronic device according to an embodiment of the disclosure.

Referring to FIG. 7, a first graph 701 may represent a channel impulse response (e.g., a second channel impulse response of FIG. 5 or 6) obtained based on only a secure field of a UWB packet. A second graph 703 may represent a channel impulse response (e.g., a third channel impulse response of FIG. 5 or 6) obtained based on both of a SYNC field and the secure field of the UWB packet. The channel impulse response of the second graph 703 may be measured as the amount of energy which is greater than the channel impulse response of the first graph 701. When a correlation between the SYNC field and the secure field is high (or when there is no security problem), a UWB communication circuit (e.g., a UWB communication circuit 210) may perform a more accurate positioning operation based on a channel impulse response of the second graph 703 having a larger value. For example, in the second graph 703, the amount of energy by a correlation of the SYNC field and the amount of energy by a correlation of the secure field may be added and represented. Thus, the second graph 703 may become higher in resolution than the first graph 701 including only the amount of energy by the correlation of the secure field, may have a signal to noise ratio (SNR) higher than a dynamic range to find a first path, and may facilitate more precise measurement than the first graph 701.

According to various embodiments, an electronic device (e.g., an electronic device 101 or a first electronic device 201) may include an antenna (e.g., an antenna module 197 or antennas 297_1 to 297_*n*) that transmits and receives a signal with an external electronic device (e.g., a second electronic device 202) and an ultra wide band (UWB) communication circuit (e.g., a communication module 197 or a UWB communication circuit 210) connected with the antenna. The UWB communication circuit may be configured to filter a positioning signal (e.g., a second signal SIG2) received from the antenna into a specified band to be converted into a digital signal, make up a UWB packet (e.g., a UWB packet 30) including a first field (e.g., a SYNC field 31) associated with synchronization and a second field (e.g., an STS field 33) associated with security, based on the digital signal, obtain a first channel impulse response corresponding to the first field and a second channel impulse response corresponding to the second field, when the UWB packet is valid based on the second field, obtain a third channel impulse response corresponding to synthetic data in which data of the first field and data of the second field are synthesized with each other, when there is a correlation between the first channel impulse response and the second channel impulse response, and measure a distance to the external electronic device based on the third channel impulse response.

According to various embodiments, the UWB communication circuit may be configured to compare the data of the second field with a previously stored reference code to determine that the UWB packet is valid, when the data of the second field and the reference code are the same as each other over a specified rate or a specified numerical number.

According to various embodiments, the UWB communication circuit may be configured to discard the UWB packet, when the same portion between the data of the second field and the reference code is less than the specified rate or the specified numerical number.

According to various embodiments, the UWB communication circuit may be configured to determine a first path based on the third channel impulse response and calculate the distance to the external electronic device based on the first path.

According to various embodiments, the UWB communication circuit may be configured to generate the third channel impulse response corresponding to the synthetic data, when the correlation between the first channel impulse response and the second channel impulse response is greater than or equal to a reference value, and measure the distance to the external electronic device based on the third channel impulse response.

According to various embodiments, the UWB communication circuit may be configured to generate the third channel impulse response corresponding to the synthetic data, when the same portion between the first channel impulse response and the second channel impulse response is greater than or equal to a specified rate or a specified numerical number, and measure the distance to the external electronic device based on the third channel impulse response.

According to various embodiments, the UWB communication circuit may be configured to measure the distance to the external electronic device based on the second channel impulse response, when the correlation between the first channel impulse response and the second channel impulse response is less than a reference value.

According to various embodiments, the UWB communication circuit may be configured to measure the distance to the external electronic device based on the second channel impulse response, when the same portion between the first channel impulse response and the second channel impulse response is less than a specified rate or a specified numerical number.

According to various embodiments, the UWB communication circuit may be configured to accumulate valid UWB packets, arrange the accumulated UWB packets by means of a window (e.g., a window 215), and calculate the first channel impulse response and the second channel impulse response based on the arranged data.

According to various embodiments, a positioning method based on an ultra wide band (UWB) signal to measure a distance to an external electronic device (e.g., a second electronic device 202) may include filtering, by a UWB communication circuit (e.g., a communication module 190 or a UWB communication circuit 210), a positioning signal received from the external electronic device into a specified band to be converted into a digital signal, making up, by the UWB communication circuit, a UWB packet (e.g., a UWB packet 30) including a first field (e.g., a SYNC field 31) associated with synchronization and a second field (e.g., an STS field 33) associated with security, obtaining, by the UWB communication circuit, a first channel impulse response corresponding to the first field and a second channel impulse response corresponding to the second field, when the UWB packet is valid based on the second field, obtaining, by the UWB communication circuit, a third channel impulse response corresponding to synthetic data in which data of the first field and data of the second field are synthesized with each other, when there is a correlation between the first channel impulse response and the second channel impulse response, and measuring, by the UWB communication circuit, the distance to the external electronic device based on the third channel impulse response.

According to various embodiments, the determining of whether the UWB packet is valid based on the second field may include comparing the data of the second field with a previously stored reference code to determine that the UWB packet is valid, when the data of the second field and the reference code are the same as each other over a specified rate or a specified numerical number.

According to various embodiments, the UWB packet may be discarded, when the same portion between the data of the second field and the reference code is less than the specified rate or the specified numerical number.

According to various embodiments, the measuring of the distance to the external electronic device may include determining a first path based on the third channel impulse response and calculating the distance to the external electronic device based on the first path.

According to various embodiments, the obtaining of the third channel impulse response may include generating the third channel impulse response corresponding to the synthetic data, when the correlation between the first channel impulse response and the second channel impulse response is greater than or equal to a reference value.

According to various embodiments, the obtaining of the third channel impulse response may include generating the third channel impulse response corresponding to the synthetic data, when the same portion between the first channel impulse response and the second channel impulse response is greater than or equal to a specified rate or a specified numerical number.

According to various embodiments, the positioning method may further include measuring the distance to the external electronic device based on the second channel impulse response, when the correlation between the first channel impulse response and the second channel impulse response is less than a reference value.

According to various embodiments, the positioning method may further include measuring the distance to the external electronic device based on the second channel impulse response, when the same portion between the first channel impulse response and the second channel impulse response is less than a specified rate or a specified numerical number.

According to various embodiments, the obtaining of the first channel impulse response and the second channel impulse response may include accumulating valid UWB packets, arranging the accumulated UWB packets by means of a window (e.g., a window 215), and calculating the first channel impulse response and the second channel impulse response based on the arranged data.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    an antenna configured to transmit and receive a signal with an external electronic device; and
    an ultra wide band (UWB) communication circuit connected with the antenna,
    wherein the UWB communication circuit is configured to:
        filter a positioning signal received from the antenna into a specified band to be converted into a digital signal,
        generate a UWB packet including a first field associated with synchronization and a second field associated with security, based on the digital signal,
        obtain a first channel impulse response corresponding to the first field and a second channel impulse response corresponding to the second field, when the UWB packet is valid based on the second field,
        obtain a third channel impulse response corresponding to synthetic data in which data of the first field and data of the second field are synthesized with each other, when there is a correlation between the first channel impulse response and the second channel impulse response, and
        measure a distance to the external electronic device based on the third channel impulse response.

2. The electronic device of claim 1, wherein the UWB communication circuit is further configured to:
    compare the data of the second field with a previously stored reference code to determine that the UWB packet is valid, when the data of the second field and the reference code are the same as each other over a specified rate or a specified numerical number.

3. The electronic device of claim 2, wherein the UWB communication circuit is further configured to:
    discard the UWB packet, when the same portion between the data of the second field and the reference code is less than the specified rate or the specified numerical number.

4. The electronic device of claim 1, wherein the UWB communication circuit is further configured to:
    determine a first path based on the third channel impulse response, and
    calculate the distance to the external electronic device based on the first path.

5. The electronic device of claim 1, wherein the UWB communication circuit is further configured to:
    generate the third channel impulse response corresponding to the synthetic data, when the correlation between the first channel impulse response and the second channel impulse response is greater than or equal to a reference value, and
    measure the distance to the external electronic device based on the third channel impulse response.

6. The electronic device of claim 1, wherein the UWB communication circuit is further configured to:
    generate the third channel impulse response corresponding to the synthetic data, when the same portion between the first channel impulse response and the second channel impulse response is greater than or equal to a specified rate or a specified numerical number, and measure the distance to the external electronic device based on the third channel impulse response.

7. The electronic device of claim 1, wherein the UWB communication circuit is further configured to:

measure the distance to the external electronic device based on the second channel impulse response, when the correlation between the first channel impulse response and the second channel impulse response is less than a reference value.

8. The electronic device of claim 1, wherein the UWB communication circuit is further configured to:

measure the distance to the external electronic device based on the second channel impulse response, when the same portion between the first channel impulse response and the second channel impulse response is less than a specified rate or a specified numerical number.

9. The electronic device of claim 1, wherein the UWB communication circuit is further configured to:

accumulate valid UWB packets, arrange the accumulated UWB packets by means of a window, and calculate the first channel impulse response and the second channel impulse response based on the data arranged by means of the window.

10. A positioning method based on an ultra wide band (UWB) signal to measure a distance to an external electronic device, the positioning method comprising:

filtering, by a UWB communication circuit, a positioning signal received from the external electronic device into a specified band to be converted into a digital signal;

generating, by the UWB communication circuit, a UWB packet including a first field associated with synchronization and a second field associated with security;

obtaining, by the UWB communication circuit, a first channel impulse response corresponding to the first field and a second channel impulse response corresponding to the second field, when the UWB packet is valid based on the second field;

obtaining, by the UWB communication circuit, a third channel impulse response corresponding to synthetic data in which data of the first field and data of the second field are synthesized with each other, when there is a correlation between the first channel impulse response and the second channel impulse response; and measuring, by the UWB communication circuit, the distance to the external electronic device based on the third channel impulse response.

11. The positioning method of claim 10, further comprising:

comparing the data of the second field with a previously stored reference code to determine that the UWB packet is valid, when the data of the second field and the reference code are the same as each other over a specified rate or a specified numerical number.

12. The positioning method of claim 11, wherein the UWB packet is discarded, when the same portion between the data of the second field and the reference code is less than the specified rate or the specified numerical number.

13. The positioning method of claim 10, wherein the measuring of the distance to the external electronic device includes:

determining a first path based on the third channel impulse response; and calculating the distance to the external electronic device based on the first path.

14. The positioning method of claim 10, wherein the obtaining of the third channel impulse response includes:

generating the third channel impulse response corresponding to the synthetic data, when the correlation between the first channel impulse response and the second channel impulse response is greater than or equal to a reference value.

15. The positioning method of claim 10, further comprising:

measuring the distance to the external electronic device based on the second channel impulse response, when the correlation between the first channel impulse response and the second channel impulse response is less than a reference value.

* * * * *